(12) United States Patent
Badenhorst

(10) Patent No.: US 10,649,788 B2
(45) Date of Patent: May 12, 2020

(54) PROCESSOR AND A METHOD OF OPERATING A PROCESSOR

(71) Applicant: Emile Badenhorst, Parys (ZA)

(72) Inventor: Emile Badenhorst, Parys (ZA)

( * ) Notice: Subject to any disclaimer, the term of this patent is extended or adjusted under 35 U.S.C. 154(b) by 0 days.

(21) Appl. No.: 16/160,324

(22) Filed: Oct. 15, 2018

(65) Prior Publication Data

US 2019/0317772 A1    Oct. 17, 2019

(30) Foreign Application Priority Data

Apr. 16, 2018  (ZA) ................................. 2018/02467

(51) Int. Cl.
*G06F 9/30*     (2018.01)
*G06F 9/38*     (2018.01)

(52) U.S. Cl.
CPC .......... *G06F 9/3869* (2013.01); *G06F 9/3004* (2013.01)

(58) Field of Classification Search
None
See application file for complete search history.

(56) References Cited

U.S. PATENT DOCUMENTS

| | | | |
|---|---|---|---|
| 5,042,000 A | | 8/1991 | Baldwin |
| 5,475,828 A | * | 12/1995 | Goto ......................... G06F 9/34 711/158 |
| 5,878,255 A | | 3/1999 | Tran |
| 6,067,601 A | * | 5/2000 | Sollars .................. G06F 9/3016 711/131 |
| 7,493,481 B1 | * | 2/2009 | Kizhepat ............. G06F 9/30018 712/224 |
| 2002/0161988 A1 | * | 10/2002 | Barlow ................. G06F 1/3203 712/221 |
| 2002/0184472 A1 | | 12/2002 | Ohsuga |
| 2010/0228918 A1 | | 9/2010 | Vorbach |
| 2011/0254848 A1 | * | 10/2011 | Bergland .................. G06T 1/20 345/501 |
| 2014/0013021 A1 | | 1/2014 | Matsumoto |
| 2014/0281423 A1 | * | 9/2014 | Caulfield ............ G06F 9/30079 712/225 |
| 2018/0052684 A1 | * | 2/2018 | Tran ..................... G06F 9/30043 |
| 2018/0267932 A1 | * | 9/2018 | Zhu ........................ G06F 9/3887 |
| 2019/0034203 A1 | * | 1/2019 | Ardanaz ............... G06F 9/3867 |

OTHER PUBLICATIONS

International Search Report for corresponding PCT application PCT/IB18/54660 dated Nov. 20, 2018.

* cited by examiner

*Primary Examiner* — Hyun Nam
(74) *Attorney, Agent, or Firm* — Pabst Patent Group LLP

(57) ABSTRACT

The disclosure provides a processor, comprising at least one core. The core comprises an input buffer, a logic unit having an input and an output, wherein the input is in communication with the input buffer, and a memory unit in communication with the output of the logic unit. The processor also comprises a CU (Control Unit) configured to direct the operation of the core and a communication bus configured to interconnect the core and the CU. The CU is configured to direct the operation of the core by providing: an instruction to the core, wherein the instruction is loaded into the logic unit and writing to the input buffer a value stored in the memory unit of one of the cores; and an output of the instruction based at least partially on the value in the input buffer, and writing the output of the instruction to the memory unit.

14 Claims, 3 Drawing Sheets

PROCESSOR AND A METHOD OF OPERATING A PROCESSOR

CROSS-REFERENCE TO RELATED APPLICATION

The present application claims benefit and priority under 35 U.S.C. § 119 to South African Patent Application No. 2018/02467, filed Apr. 16, 2018, which is incorporated herein by reference.

FIELD OF DISCLOSURE

The disclosure relates to a processor and a method of operating a processor, and specifically to a processor which can eliminate or reduce race conditions or memory locking.

BACKGROUND OF DISCLOSURE

The Applicant has observed a problem with instruction execution of conventional computer processors and specifically with multi-threading and parallelism. Because two instructions can be executed at the same moment in time, they can read or write the memory at a specific index at the same time. The reason this is problematic is that programs rely on the order of execution.

For example, if a web server hosting a website that has a lot of traffic, it may serve a web page using multiple threads, and the following can occur:
1. When the web server receives a request, it reads a value in memory which contains the total time the web page has been viewed.
2. The web server then increments the value and then updates the value in memory.

More specifically, thread X and thread Y may try to access a value Z. If value Z is 10 and thread X increments the value by 5 and at the very same time thread Y increments the value by 2, it will come down to a race as to whether thread X or thread Y is the last thread to write to value Z. Therefore, the value can end up either as 15 or 12, neither of which is accurate. The final value should be 17. This phenomenon is known as Race Conditions. The predominant solution to this problem is 'Locking' wherein thread X locks value Z, preventing thread Y from manipulating value Z. Once thread X has completed its operation, thread Y then locks value Z preventing thread X from accessing value Z, thereby ensuring concurrency.

The Applicant believes that fundamental problems with the 'Locking' approach may include:
1. All other threads that are not currently accessing the specific memory index are put on hold and must wait for the lock to be released. This results in dead-time where no computations are calculated.
2. This causes a fundamental limitation wherein the time and processing power required to orchestrate and manage threads and locks outweighs the advantages gained from multi-threading on a larger scale.
3. Race Conditions are extremely challenging to find and debug and often require large architectural changes in computer code, resulting in unwanted complexity, which can result in un-maintainability. The more components there are in a program, the more room there is for bugs. The result is that a programmer's job is more difficult.

To address this problem, it is necessary to understand how data is represented in space and time. Currently, computers store data in a mutable fashion, meaning that most areas of memory are read and writeable. Because all data or information that has ever existed, exists in the framework of space and time, the fundamental nature of information is immutable, meaning that information can't change in the current frame of time. The state of information can only propagate in a forward direction (that is, forward in time). In other words, for a given frame definition, every frame in time is immutable. When a new frame of time is created every state moves to the next frame with a change in state. Therefore, the past cannot be changed, only the future can be changed. All data that has ever existed, or that will exist, whether the information is stored on a computer, or memorised by a human, or in any other means, must exist in the physical world in some form or another. All physical matter is subject to the laws of time. Therefore, it is safe to assume that any construct, idea or information exists physically, which in turn means that said information can be represented in an immutable fashion, as per the nature of time.

The Applicant wishes to apply this theory to processor architecture and accordingly to any computing or electronic device which comprises a processor. Because all information can be modelled immutably, a computer processor can be created that follows the same fundamental model of time. Therefore, Race Conditions theoretically cannot exist in the same way that causality cannot be violated.

SUMMARY OF DISCLOSURE

The disclosure provides a processor, which comprises at least one core. The core comprises at least one input buffer, a logic unit having an input and an output, wherein the input is in communication with the input buffer, and a memory unit in communication with the output of the logic unit. The processor also comprises a CU (Control Unit) configured to direct the operation of the core and a communication bus configured to interconnect the core and the CU. The CU is configured to direct the operation of the core by providing an instruction to the core, wherein the instruction is loaded into the logic unit and writing to the input buffer a value stored in the memory unit of one of the cores. The CU is further configured to direct the operation of the core by providing, via logic unit, an output of the instruction based at least partially on the value in the input buffer, and writing the output of the instruction to the memory unit.

Accordingly, the disclosure provides a processor which comprises:
  at least one core which comprises:
    at least one input buffer;
    a logic unit having an input and an output, wherein the input is in communication with the input buffer; and
    a memory unit in communication with the output of the logic unit;
  a CU (Control Unit) configured to direct the operation of the core; and
  a communication bus configured to interconnect the core and the CU, wherein the CU is configured to direct the operation of the core by:
    providing an instruction to the core, wherein the instruction is loaded into the logic unit;
    writing to the input buffer a value stored in the memory unit of one of the cores;
    providing, by the logic unit, an output of the instruction based at least partially on the value in the input buffer; and
    writing the output of the instruction to the memory unit.

The logic unit may be an ALU (Arithmetic Logic Unit), and FPU (Floating Point Unit), a custom or integrated logic circuit, etc. This type of processor architecture lends itself well to use of an ALU and the disclosure is further described with reference to the logic unit in the form of an ALU, but the scope of the disclosure is not necessary limited to use of ALUs.

The may be plural cores. While this processor architecture may be workable in only a single core, more advantage may be gained by use of plural cores due to parallelism which may be provided by the processor. The disclosure is further described with reference to plural cores, but the disclosure may cover a single core or plural cores.

The CU may be configured to operate each core in parallel. The CU may be configured to operate each core iteratively. The CU may be configured to operate the cores such that only once all of the input buffers have been written with the values stored in the memory units may the memory units be written with the output from the ALU.

Each core may include two input buffers, namely a first input buffer and a second input buffer. The ALU may be configured to provide the output based on the values stored in both the first and second buffers.

The value read into the input buffer may be from the memory unit of the same core as the input buffer, or from a different core to that of the input buffer.

There may be a very high number of cores. A practical limitation is that each core may require a unique index or address. For example, a 32-bit processor may provide $2^{32}-1$ cores, and a 64-bit processor may provide $2^{64}-1$ cores. There may be a practical maximum of $2^{no.\ of\ bits}-1$ cores. All the cores may be used at the same time without Race Conditions or thread locking.

The instruction may include, or may be in the form of, opcode.

The Applicant proposes that this may be conceptualised as a plurality of time frames, wherein a processing cycle represents a time frame.

The disclosure extends to a method of operating a processor having at least two cores, the method comprising:
providing an instruction from a CU (Control Unit) to a logic unit of each core via a communication bus which interconnects the CU and the cores;
writing to an input buffer connected to an input of the logic unit a value stored in a memory unit of one of the cores, the memory unit being connected to an output of the logic unit;
providing, by the logic unit, an output of the instruction based at least partially on the value in the input buffer; and
writing the output of the instruction to the memory unit.

The method may include operating the logic unit in the form of an ALU (Arithmetic Logic Unit).

The method may include writing values to two input buffers, namely a first input buffer and a second input buffer. The values may be written from the memory unit of the same core as the input buffer, and/or from a different core to that of the input buffer.

The method may include operating the plurality of cores in parallel.

The method may be implemented by the processor defined above.

The disclosure extends to a computer-readable medium which, when executed by a computer processor, operates the processor in accordance with the method as defined above.

The theory and model behind the processor and method may be as follows (with reference to example values and data). Table 1 represents State of Memory and Table 2 represents Instructions.

TABLE 1

| # | C0 | C1 | C2 | C3 | C4 | C5 | C6 |
|---|----|----|----|----|----|----|----|
| 1 | 10 | 10 |    |    |    |    |    |
| 2 | 20 |    |    |    |    |    |    |
| 3 |    |    |    |    |    |    |    |

TABLE 2

| # | C0 | C1 | C2 | C3 | C4 | C5 | C6 |
|---|---------|-----|----|----|----|----|----|
| 1 | L10     | L10 |    |    |    |    |    |
| 2 | C0 + C1 |     |    |    |    |    |    |
| 3 |         |     |    |    |    |    |    |

In Tables 1-2, every column (C0, C1 . . . ) represents a memory address. Data type is irrelevant to the model, but in this example, unsigned integers are used. Every row represents a cycle of computation which is designated a frame. Theoretically, the number of frames and memory can be infinite. First, the model moves from frame to frame. Every frame can only be written once. A frame can only be created and not changed, therefore it is immutable. This closely models the nature of time.

Frame 1: Referencing instruction Frame 1, C0 contains the instruction to load the literal 10 into the memory index of C0. The same applies for C1. Therefore, the state of the memory is the literal 10 in C0 and C1.

Frame 2: Because frames are immutable, the previous frame can only be read and not written. Bearing this in mind, we can see that the only instruction in frame 2 is cell C0. The instruction in this cell is an addition operator that de-references the address C0 and C1 to add both values together, writing the result to C0 in the current frame.

Therefore, the model has computed the algorithm 10+10, resulting in 20. Because every frame is immutable (only propagating in one direction), all calculations of every memory cell for the current frame can be calculated at the same time without violating concurrency or creating race conditions.

Having a dedicated memory unit and ALU for each frame would be impractical and not scalable, which is why the processor and method defined above use the same memory unit and ALU iteratively.

BRIEF DESCRIPTION OF DRAWINGS

The disclosure will now be further described, by way of example, with reference to the accompanying diagrammatic drawings.

In the drawings.

DETAILED DESCRIPTION OF EXAMPLE EMBODIMENT

The following description of the disclosure is provided as an enabling teaching of the disclosure. Those skilled in the relevant art will recognise that many changes can be made to the embodiment described, while still attaining the beneficial results of the present disclosure. It will also be apparent that some of the desired benefits of the present disclosure can be attained by selecting some of the features of the present disclosure without utilising other features. Accordingly, those skilled in the art will recognise that modifications and adaptations to the present disclosure are possible and can even be desirable in certain circumstances, and are a part of the present disclosure. Thus, the following description is provided as illustrative of the principles of the present disclosure and not a limitation thereof.

Figure 3:
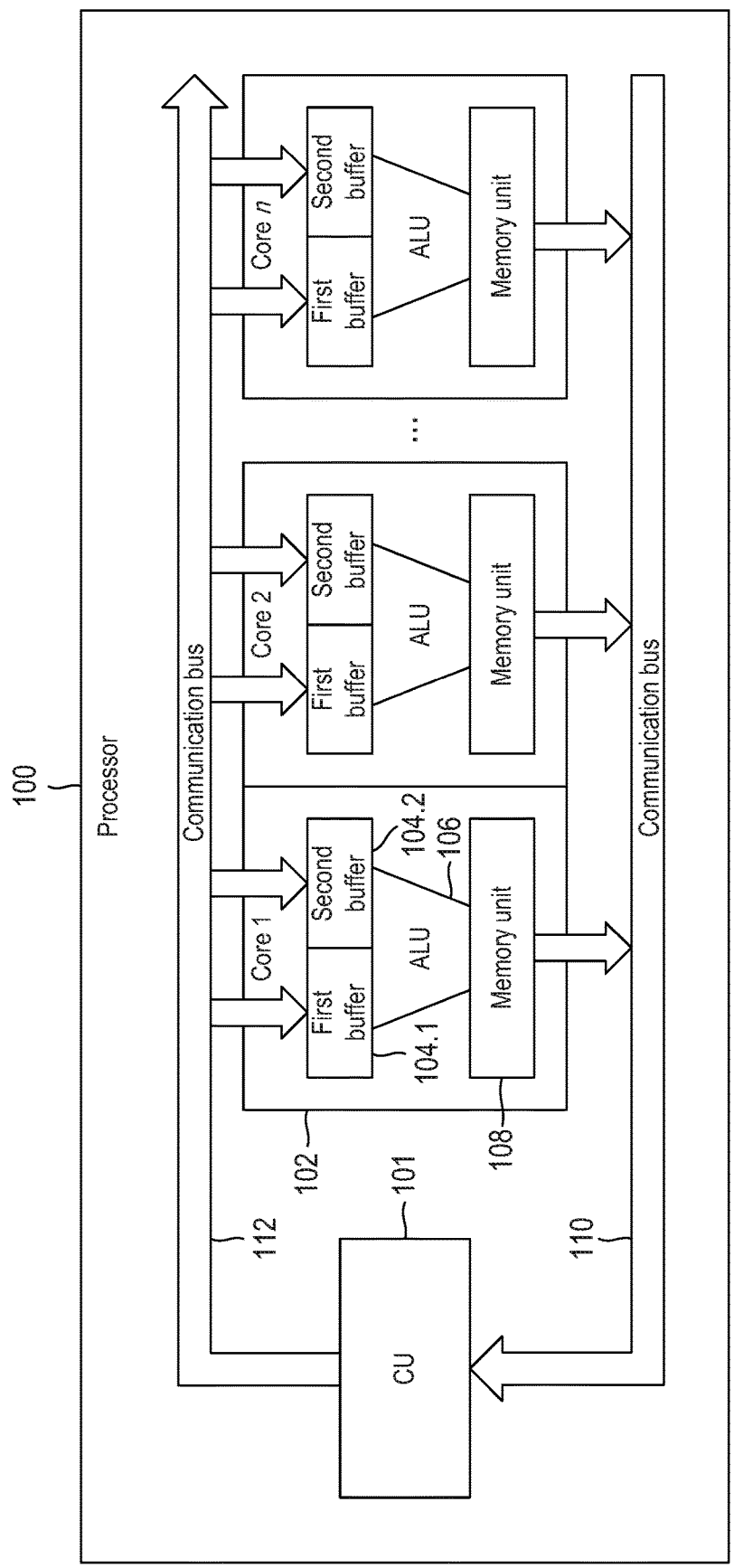
FIG. 3 shows a schematic view of a processor in accordance with the disclosure.
Figure 4:
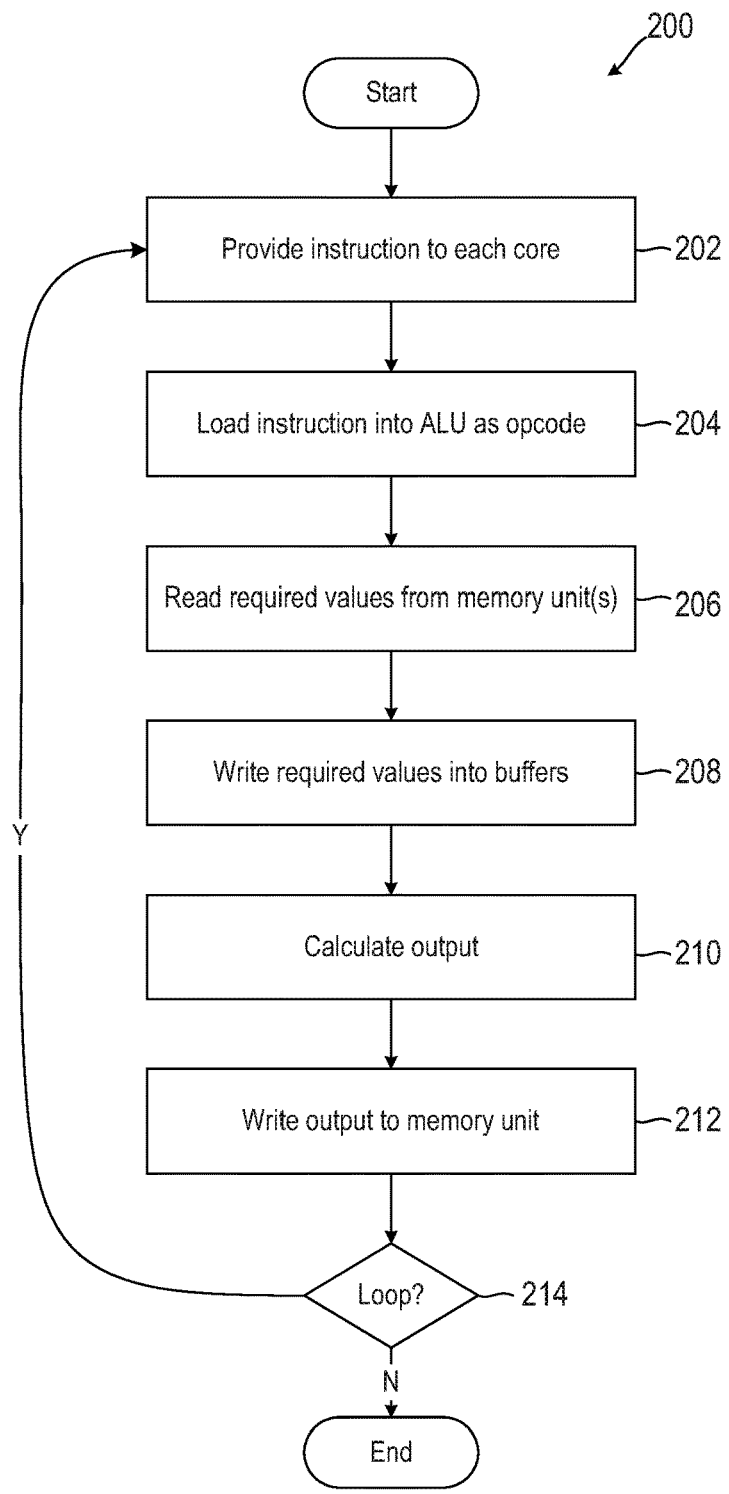
FIG. 4 shows a flow diagram of a method of operating a processor in accordance with the disclosure.

The disclosure provides a processor 100 (illustrated in FIG. 3) and a method 200 (illustrated in FIG. 4). However, FIGS. 1-2, although not necessarily part of the disclosure, provide an understanding of the model which the processor 100 and method 200 implement and tie in with the description in the Summary of Disclosure.

Figure 1:
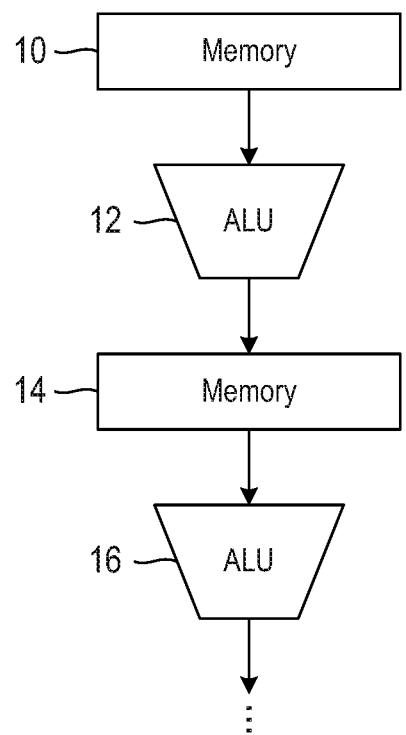
FIG. 1 shows a conceptual processor model.

FIG. 1 illustrates a conceptual processor. By feeding every memory location 10, 14 into an ALU 12, 16 all the values in every memory location 10, 14 at the same time and feed the results into a new memory frame 10, 14; however, it is impossible to have an infinite amount of memory frames nor is it possible to have an infinite amount of ALUs 12, 16, which makes this design impractical.

Figure 2:
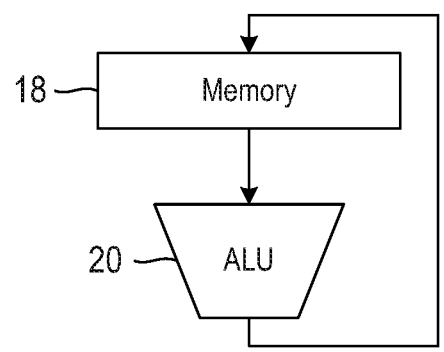
FIG. 2 shows a looped version of the model of FIG. 1.

To implement this practically, and as illustrated in FIG. 2, desired behaviour can be simulated by feeding an ALU output into the memory 18, then feeding the memory output into a buffer that feeds into the ALU 20 again, resulting in a loop that mimics the exact same behaviour. The reason the behaviour is mimicked, is because the only frame that is relevant to calculate the values in the current frame is the previous frame. Therefore, all the previous frames that precede the immediate previous frame, are irrelevant to the execution state and can therefore be discarded.

FIG. 3 illustrates a processor 100 in accordance with the disclosure. The processor 100 comprises a plurality of cores 102 (only three of which are illustrated: core 1, core 2, and core n). However, it will be appreciated that there may be numerous cores, even orders of magnitude higher than presently available consumer-grade processors which typically have 2-16 cores.

Each core 102 comprises two buffers 104, namely a first buffer 104.1 and a second buffer 104.2. There may be other implementations in which the core 102 comprises only a single buffer or more than two buffers, but given that opcode and logic is often applied to only two inputs, having two input buffers 104 is appropriate for this example. The processor 100 has at least one CU 101 which is configured to direct the operation of the cores 102 as is described below.

Each core 102 comprises an ALU 106. The ALU 106 itself may be somewhat conventional in that it has in input, or pair of inputs, connected to the buffers 104, and an output connected to a memory unit 108. The ALU 106 is configured to implement an instruction usually in the form of opcode based on inputs from the input buffers 104 to produce an output which is written to the memory unit 108.

A communication bus 110, or a network of communication buses, interconnects the CU 101 and the cores 102, and any other peripheral components as may be needed.

The processor 100 is further described with reference to a method 200 of operating a processor as illustrated in FIG. 4. However, it will be appreciated that the processor 100 may be configured to implement a different method and that the method 200 may be implemented on a differently-configured processor.

The method 200 illustrates a single cycle but may be looped indefinitely. A practical example of one cycle is as follows:

Block 202: The CU 101 provides an instruction to each core 102. The instruction is provided as opcode which is understood in ALU terminology. Different instructions may be provided to different ALUs 106.

Block 204: The ALU 102 is loaded into each ALU 106 as opcode.

Block 206: Required values of the previous frame (as presently stored in the memory units 108) are read.

Block 208: The required values read from the memory units are written to the buffers 104 via the communication bus 110.

Block 210: The ALUs 106 calculate an output based on the input from the buffers 104 and the specific opcode provided.

Block 212: The output is written to the associated memory unit 108.

This method 200 loops (at block 214) indefinitely. This indefinite loop provides storage of the output from the present cycle (in the memory unit 108) as well as storage of all or some outputs from the previous cycle in the buffers 104. Based on the model, all that is required is the output of the present cycle and the previous cycle. The buffers 104, ALUs 106, and memory units 108 are then recycled in the next cycle.

The Applicant believes that the processor 100 and method 200 as exemplified have several advantages:

The memory itself (in the form of the memory units 108 and/or the buffers 104) is combined with the core 102, drastically decreasing the time required to move values from memory into a core, because the memory and the core can be in the same chip. Therefore, no data has to be retrieved from an external memory source.

The processor 100 can execute massively parallel multiple threads concurrently.

Multiple threads can execute at the same time using the same specific memory location without mutual exclusion or locking or race conditions occurring.

Memory may only be written once in a cycle after which point it becomes "Read Only". The processor state always moves in one direction.

Every memory location may be processed at the same time.

I claim:

1. A processor which comprises:
at least one core which comprises:
at least one input buffer;
a logic unit having an input and an output, wherein the input is in communication with the input buffer; and
a memory unit in communication with the output of the logic unit;
a CU (Control Unit) configured to direct the operation of the core; and
a communication bus configured to interconnect the core and the CU, wherein the CU is configured to direct the operation of the core by:
providing an instruction to the core, wherein the instruction is loaded into the logic unit;
writing to the input buffer a value stored in the memory unit of one of the cores;
providing, by the logic unit, an output of the instruction based at least partially on the value in the input buffer; and
writing the output of the instruction to the memory unit.

2. The processor of claim 1, wherein the logic unit is an ALU (Arithmetic Logic Unit).

3. The processor of claim 1, wherein there are plural cores.

4. The processor of claim 3, wherein the CU is configured to operate each core in parallel and iteratively.

5. The processor of claim 4, wherein the CU is configured to operate the cores such that only once all of the input buffers have been written with the values stored in the memory units are the memory units written with the output from the logic unit.

6. The processor of claim 3, wherein each core comprises two input buffers, namely a first input buffer and a second input buffer.

7. The processor of claim 6, wherein the logic unit is configured to provide the output based on the values stored in both the first and second buffers.

8. The processor of claim 6, wherein the value read into the input buffer is from the memory unit of the same core as the input buffer, or from a different core to that of the input buffer.

9. The processor of claim 1, wherein the instruction include, or are in the form of, opcode.

10. A method of operating a processor having at least one core, the method comprising:
   providing an instruction from a CU (Control Unit) to a logic unit of the core via a communication bus which interconnects the CU and the core;
   writing to an input buffer connected to an input of the logic unit a value stored in a memory unit of the core, the memory unit being connected to an output of the logic unit;
   providing, by the logic unit, an output of the instruction based at least partially on the value in the input buffer; and
   writing the output of the instruction to the memory unit.

11. The method of claim 10, wherein the processor has at least two cores and the logic unit is an arithmetic logic unit (ALU), the method comprising:
   providing the instruction from the CU to the ALU of each core via the communication bus which interconnects the CU and the cores;
   writing to the input buffer connected to the input of the ALU the value stored in the memory unit of one of the cores, the memory unit being connected to the output of the ALU;
   providing, by the ALU, the output of the instruction based at least partially on the value in the input buffer; and
   writing the output of the instruction to the memory unit.

12. The method of claim 11, which comprises writing values to two input buffers, namely a first input buffer and a second input buffer.

13. The method of claim 12, which comprises writing the values from the memory unit of the same core as the input buffer, and/or from a different core to that of the input buffer.

14. The method as claimed in claim 13, which comprises operating the plurality of cores in parallel and iteratively.

* * * * *